United States Patent
Sutton

(10) Patent No.: US 9,464,532 B2
(45) Date of Patent: Oct. 11, 2016

(54) SYSTEM AND METHOD FOR REDUCING ROTOR BLADE NOISE

(71) Applicant: Bell Helicopter Textron Inc., Fort Worth, TX (US)

(72) Inventor: Drew Sutton, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 710 days.

(21) Appl. No.: 13/785,892

(22) Filed: Mar. 5, 2013

(65) Prior Publication Data

US 2014/0255184 A1  Sep. 11, 2014

(51) Int. Cl.
| | | |
|---|---|---|
| F01D 7/00 | (2006.01) | |
| B64C 23/06 | (2006.01) | |
| B64C 27/467 | (2006.01) | |
| B64C 27/615 | (2006.01) | |
| B64C 27/72 | (2006.01) | |
| F01D 5/14 | (2006.01) | |

(52) U.S. Cl.
CPC ............. *F01D 7/00* (2013.01); *B64C 23/06* (2013.01); *B64C 27/467* (2013.01); *B64C 27/615* (2013.01); *B64C 27/72* (2013.01); *B64C 2027/7261* (2013.01); *B64C 2230/14* (2013.01); *B64C 2230/26* (2013.01); *B64C 2230/28* (2013.01); *F01D 5/145* (2013.01); *Y02T 50/162* (2013.01); *Y02T 50/166* (2013.01); *Y02T 50/34* (2013.01); *Y02T 50/66* (2013.01)

(58) Field of Classification Search
CPC ............ F01D 7/00; F01D 5/145; F01D 5/18; F01D 5/187; B64C 27/615; B64C 27/72; B64C 27/467; B64C 23/06; B64C 2230/14; B64C 2230/26; B64C 2230/28; B64C 2027/7261; Y02T 50/166; Y02T 50/162; Y02T 50/66; Y02T 50/34; F04D 29/325; F04D 29/34; F04D 29/38; F04D 29/384; F04D 29/388; F04D 29/36; F04D 29/362
USPC .............................................................. 416/1
See application file for complete search history.

(56) References Cited

U.S. PATENT DOCUMENTS

| | | | | |
|---|---|---|---|---|
| 2,010,094 | A | * 8/1935 | Leinweber | B64C 11/16 416/236 A |
| 2,238,749 | A | * 4/1941 | Peltier | F04D 29/384 415/119 |
| 2,272,358 | A | * 2/1942 | Steinhaus | B64C 11/24 244/200 |
| 2,800,291 | A | * 7/1957 | Stephens | B62D 35/00 114/67 R |
| 3,144,220 | A | * 8/1964 | Kittelson | B64C 23/00 244/199.1 |
| 3,456,904 | A | 7/1969 | Dorand | |
| 4,032,087 | A | 6/1977 | Cleaves | |

(Continued)

FOREIGN PATENT DOCUMENTS

| | | |
|---|---|---|
| EP | 0887257 A2 | 12/1998 |
| WO | 0037310 A2 | 6/2000 |
| WO | 03039949 A2 | 5/2003 |

OTHER PUBLICATIONS

U.S. Appl. No. 13/785,892—Lee and Chopra—Trailing Edge Flap Actuator.*

(Continued)

*Primary Examiner* — Charles Freay
*Assistant Examiner* — Jon Hoffmann
(74) *Attorney, Agent, or Firm* — Fish & Richardson P.C.

(57) ABSTRACT

A rotor blade includes an active flap and an airflow disturber configured to selectively alter airflow across the active flap.

17 Claims, 8 Drawing Sheets

(56) References Cited

U.S. PATENT DOCUMENTS

| | | | | |
|---|---|---|---|---|
| 4,459,083 A * | 7/1984 | Bingham | ............... | B64C 11/18 244/35 R |
| 5,253,828 A * | 10/1993 | Cox | ............... | B64C 23/06 244/200.1 |
| 5,518,210 A * | 5/1996 | Friberg | ............... | B64C 3/50 244/198 |
| 5,598,990 A * | 2/1997 | Farokhi | ............... | B64C 23/06 244/198 |
| 5,860,626 A * | 1/1999 | Moser | ............... | B63B 1/36 244/130 |
| 6,425,553 B1 | 7/2002 | Smith et al. | | |
| 7,028,954 B2 * | 4/2006 | Van Dam | ............... | B64C 3/44 244/204 |
| 7,419,356 B2 * | 9/2008 | Stiesdal | ............... | F03D 1/0641 416/1 |
| 7,566,203 B2 * | 7/2009 | Moser | ............... | F03D 1/0633 416/235 |
| 7,878,457 B2 * | 2/2011 | Narramore | ............... | B64C 23/06 244/200.1 |
| 7,900,871 B2 * | 3/2011 | Rincker | ............... | B64C 23/06 244/134 A |
| 8,579,594 B2 * | 11/2013 | Fuglsang | ............... | F01D 5/145 416/231 R |
| 8,870,124 B2 * | 10/2014 | Ireland | ............... | B64C 23/06 244/130 |
| 8,876,064 B2 * | 11/2014 | Seifert | ............... | B64C 21/025 244/208 |
| 2007/0131820 A1 * | 6/2007 | Chaudhry | ............... | B64C 27/001 244/17.25 |
| 2008/0138203 A1 * | 6/2008 | Collins | ............... | B64C 27/615 416/23 |
| 2008/0145220 A1 * | 6/2008 | Yeh | ............... | B64C 27/615 416/23 |
| 2008/0145221 A1 * | 6/2008 | Sun | ............... | B64C 27/615 416/23 |
| 2009/0108141 A1 * | 4/2009 | Shmilovich | ............... | B64C 3/58 244/207 |
| 2009/0127404 A1 | 5/2009 | Lee et al. | | |
| 2010/0181433 A1 * | 7/2010 | Catino | ............... | B64C 21/025 244/208 |
| 2011/0008174 A1 * | 1/2011 | Ireland | ............... | B64C 23/06 416/223 R |
| 2011/0103952 A1 * | 5/2011 | Pesetsky | ............... | F03D 1/06 416/1 |
| 2011/0120980 A1 | 5/2011 | Corke et al. | | |
| 2011/0164976 A1 | 7/2011 | Matalanis et al. | | |
| 2011/0223033 A1 * | 9/2011 | Wang | ............... | F03D 1/0608 416/235 |
| 2011/0229321 A1 * | 9/2011 | Kilaras | ............... | F03B 3/121 416/1 |
| 2011/0229329 A1 * | 9/2011 | Occhipinti | ............... | B64C 11/16 416/223 R |
| 2011/0303796 A1 * | 12/2011 | Etling | ............... | B64C 7/00 244/90 R |
| 2012/0070788 A1 * | 3/2012 | Noh | ............... | F23D 14/32 431/187 |

OTHER PUBLICATIONS

U.S. Appl. No. 13/785,892—Barrett—1999—Wind Tunnel Testing.*
U.S. Appl. No. 13/785,892—Millott and Friedmann—1994—Vibration Reduction.*
U.S. Appl. No. 13/785,892—Millott and Friedmann—1995—Vibration Reduction.*
Communication from a Counter-Part Application; Extended European Search Report; European Application No. EP 13165379.2; Sep. 30, 2013; 7 pgs.
European Search Report issued in European Application No. 16153598.4 on Jun. 14, 2016, 4 pages.

* cited by examiner

SYSTEM AND METHOD FOR REDUCING ROTOR BLADE NOISE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rotor systems sometimes generate undesirable noise. Examples of such noise may include blade-vortex interaction (BVI) noise that is associated with a following rotor blade passing through a tip vortex of a leading rotor blade. Another type of noise may include high-speed impulsive (HSI) noise associated with transonic shocks generated by moving the rotor blades through air at his speeds. Further, some rotor systems may experience reduced efficiency as a function of a thickening of a boundary layer of air along a surface of a rotor blade.

SUMMARY

In some embodiments of the disclosure, a rotor blade is disclosed as comprising an active flap and an airflow disturber configured to selectively alter airflow across the active flap.

In other embodiments of the disclosure, a rotor system is disclosed as comprising a first rotor blade comprising an active flap and an airflow disturber configured to selectively disturb airflow across the active flap of the first rotor blade.

In yet other embodiments of the disclosure, a method of controlling a rotor system is disclosed as comprising providing a first rotor blade with an active flap, providing a second rotor blade with an active flap, providing at least one of the first rotor blade and the second rotor blade with an airflow disturber, and selectively controlling the airflow disturber to interact with airflow.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to improve a rotor system, such as, but not limited to, a rotor system of a helicopter to generate less noise and provide more power. In some embodiments of the disclosure, systems and methods are disclosed that comprise disturbing an airflow across a surface of a rotor blade to reduce a boundary layer thickness that may be determinative in reducing one or more types of noise generated by the rotor system.

Figure 1:
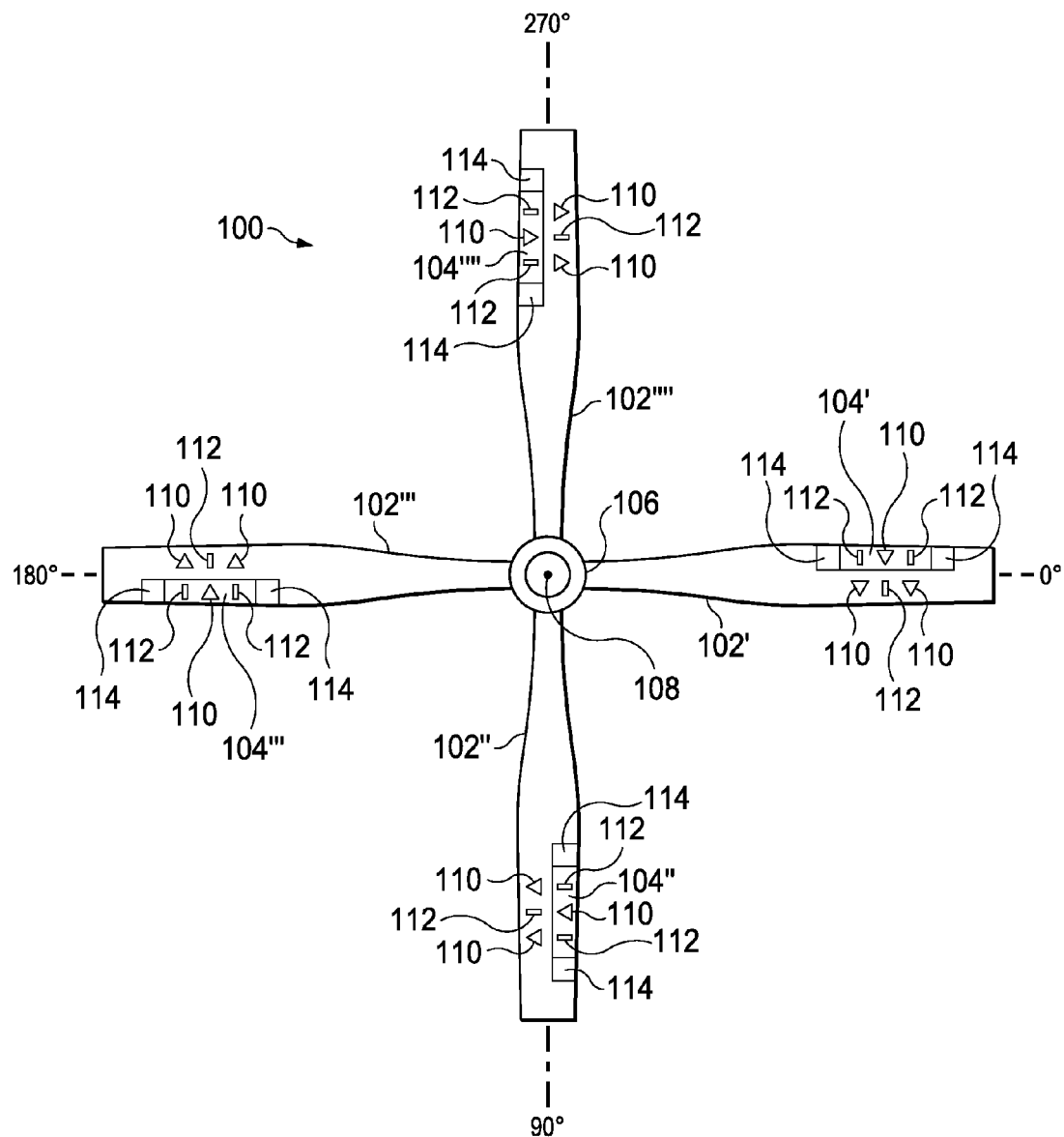
FIG. 1 is an orthogonal top view of a rotor system according to an embodiment of the disclosure.

Referring now to FIG. 1, an orthogonal top view of a rotor system 100 according to an embodiment of the disclosure is shown. The rotor system 100 comprises a plurality of rotor blades 102. Each rotor blade 102 comprises an active flap 104 that is generally movable relative to the remainder of the rotor blade 102. In some embodiments, the active flaps 104 may be controlled in response to vibrations sensed and/or anticipated by a control system. Each of the rotor blades 102 is connected to a rotor hub 106 that generally rotates about a center of rotation 108 that may be associated with a driving mechanism, such as a mast of a helicopter. In operation, the rotor system 100 may angularly displace each of the rotor blades 102 in a circular path generally denoted as being angularly measured as an azimuth value. In this embodiment, an azimuth value of 0° is associated with a rotor blade 102' that is generally centered along a path extending from the center of rotation 108 toward a rear of the rotor system 100. An azimuth value of 90° is associated with a rotor blade 102" that is generally centered along a path extending from the center of rotation 108 toward a right side of the rotor system 100. An azimuth value of 180° is associated with a rotor blade 102''' that is generally centered along a path extending from the center of rotation 108 toward a front of the rotor system 100. An azimuth value of 270° is associated with a rotor blade 102'''' that is generally centered along a path extending from the center of rotation 108 toward a left side of the rotor system 100. Most generally, rotor blades 102 advance clockwise as viewed from above to sweep through the azimuth values in a cyclic manner.

Further, the active flaps 104', 104'', 104''', 104'''' are associated with rotor blades 102', 102'', 102''', 102''''. In some embodiments, the active flaps 104 may be controlled to maintain a same percent of deployment. In other words, when active flaps 104 are movable between an inactive position where the active flaps 104 are positioned within the generally adjacent profile of the rotor blade 102 and a fully deployed position (whether fully deployed flap up or fully deployed flap down), the relative position of the active flaps 104 may be described as being deployed a particular percent of such range of deployment. In some embodiments, the active flaps 104 may be controlled to conform to a cyclic pattern of percentage of deployment so that active flaps 104', 104'', 104''', 104'''' may comprise different percentages of active flap 104 deployment. In some embodiments, the cyclic pattern of active flap 104 deployment may be associated with an orientation of a swash plate of a helicopter.

The rotor blades 102 further comprise a plurality of wedge disturbers 110, gate disturbers 112, and flap shields 114. The wedge disturbers 110 may comprise a generally prismatic and/or triangular profile configured for selective projection from a surface profile of the rotor blades 102. In some cases, when the wedge disturbers 110 are deployed so that they extend beyond a surface profile of the rotor blades 102, the wedge disturbers 110 direct air to the left and right of the wedge disturbers 110 while also generating a vortex or other airflow disturbance downstream of a rear portion of the wedge disturbers 110. In some cases, the vortex or other airflow disturbance generated by a wedge disturber 110 may reduce a boundary layer thickness of air flowing across one or more of the rotor blade 102 and the active flap 104, thereby potentially reducing noise generated by the rotor system 100 and/or increasing an efficiency of the rotor system 100. In some cases, the increased efficiency may be associated with the rotor system 100 generating relatively more thrust without increasing a rotational power input to the rotor system 100.

The gate disturbers 112 may comprise a generally arc shaped or partially circular profile configured for selective projection from a surface profile of the rotor blades 102. In some cases, when the gate disturbers 112 are deployed so that they extend beyond a surface profile of the rotor blades 102, the gate disturbers 112 direct air to the left and right of the gate disturbers 112 and generally provide barriers against which air may encounter to thereafter maintain a more directly chordwise path across the rotor blade 102. In some cases, the enforced and/or improved chordwise path of airflow across a rotor blade 102 generated by a gate disturber 112 may reduce a boundary layer thickness of air flowing across one or more of the rotor blade 102 and the active flap 104, thereby potentially reducing noise generated by the rotor system 100 and/or increasing an efficiency of the rotor system 100. In some cases, the increased efficiency may be associated with the rotor system 100 generating relatively more thrust without increasing a rotational power input to the rotor system 100. In some cases, the gate disturbers 112 and/or the wedge disturbers cause vortexes that thicken and/or energize a boundary layer across the rotor blade 102 and/or active flap 104, thereby increasing a distance and/or deviation angle that a surface of the rotor blade 102 and/or active flap 104 may deviate from flat while retaining the flow of air.

The flap shields 114 may comprise a folded-fan or angularly stacked arrangement of circle segments that may be retained and/or pinned to rotate in unison with deployment of active flaps 104. The flap shields 114 may generally extend from a stowed position generally within an exterior profile of the rotor blade 102 to deployed configuration in which the flap shields 114 restrict air movement through what would otherwise be a gap between adjacent portions of the rotor blade 102 and the active flaps 104. In other words, in some embodiments, the flap shields 114 may force air to encounter and travel around a deployed flap shield 114 rather than passing through an open space between the an active flap 104 and a rotor blade 102 as viewed from the left and/or right. In doing so, flap shields 114 may prevent air from flowing over active flaps 104 and air from flowing over the portion of rotor blade 102 laterally adjacent to active flaps 104 from mixing with each other. The flap shields 114 may emulate airflow that may occur if the active flaps 104 were integral to the rotor blades 102 and merely selectively localized deformations of the rotor blades 102 so that airflow across the rotor blades 102. In some cases, when the flap shields 114 are deployed so that they extend beyond a surface profile of the rotor blades 102, the flap shields 114 may reduce noise generated by the rotor system 100 and/or increase an efficiency of the rotor system 100. In some cases, the increased efficiency may be associated with the rotor system 100 generating relatively more thrust without increasing a rotational power input to the rotor system 100.

Figure 2:
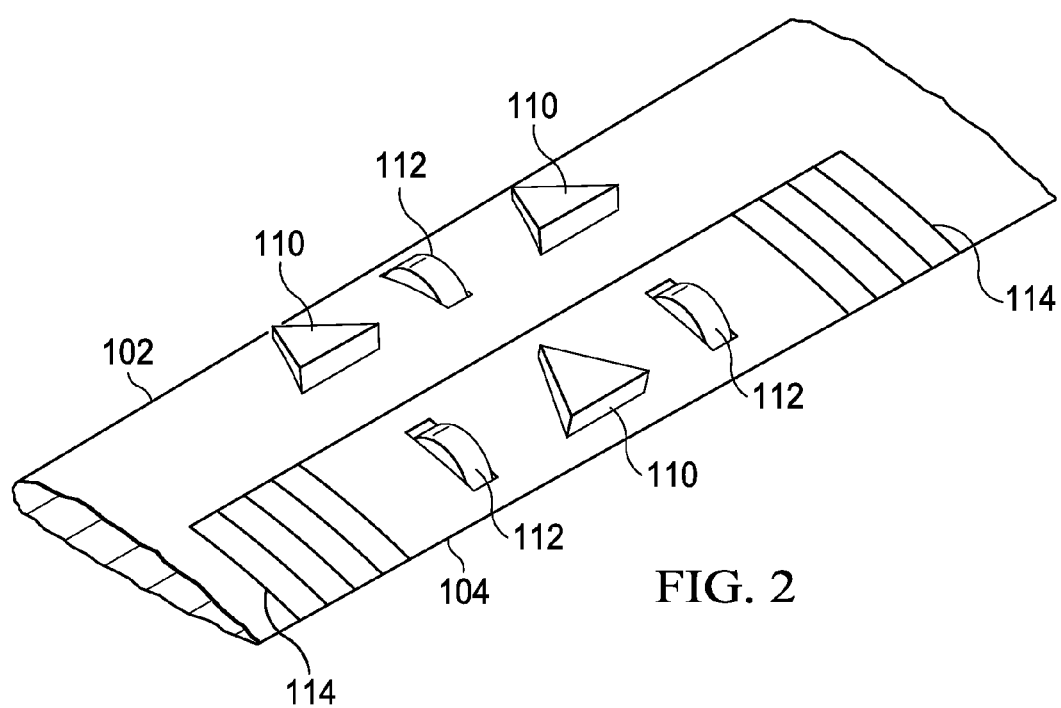
FIG. 2 is an oblique close-up view of a portion of a rotor blade of the rotor system of FIG. 1.

Referring now to FIG. 2, an oblique close-up view of a portion of a rotor blade 102 is shown according to an embodiment of the disclosure. In some embodiments, the wedge disturbers 110 may be located on both the rotor blade 102 and the active flap 104. However, in alternative embodiments, the wedge disturbers 110 may be located on only the rotor blade 102 or the active flap 104. Similarly, the gate disturbers 112 may be located on both the rotor blade 102 and the active flap 104. However, in alternative embodiments, the gate disturber 112 may be located on only the rotor blade 102 or the active flap 104. Further, while two flap shields 114 are shown as being associated with the active flap 104, in alternative embodiments, flap shields 114 may be provided with a left side or a right side of the active flap 104. Still further, while the rotor blade 102 is shown as comprising each of the wedge disturbers 110, gate disturbers 112, and flap shields 114, in some embodiments, a rotor blade 102 may not comprise any wedge disturber 110, gate disturber 112, and/or flap shield 114. Referring back to FIG. 1, while the rotor system 100 is shown as comprising rotor blades 102 that have substantially the same types, numbers, and locations of wedge disturbers 110, gate disturbers 112, and flap shields 114, in alternative embodiments, rotor blades 102 of the same rotor system 100 may comprise different combinations of wedge disturbers 110, gate disturbers 112, and flap shields 114 and at different combinations of numbers and locations.

Figure 3A:
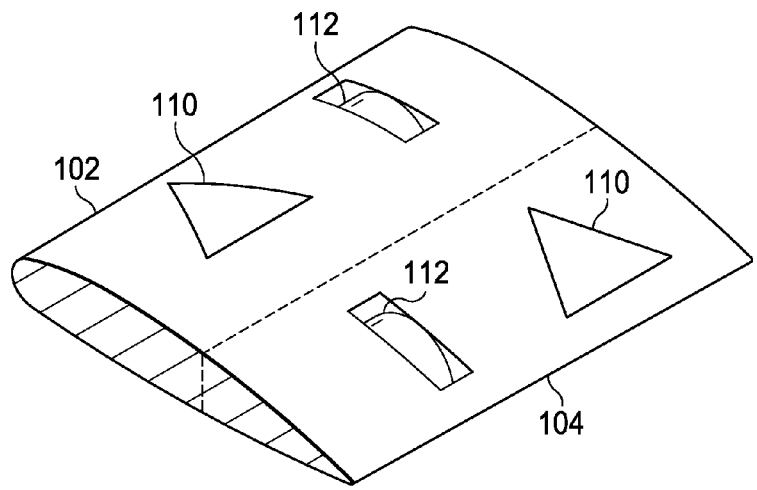
FIG. 3A is an oblique cut-away view of a portion of the rotor blade of FIG. 2 in a stowed/inactive configuration.
Figure 3B:
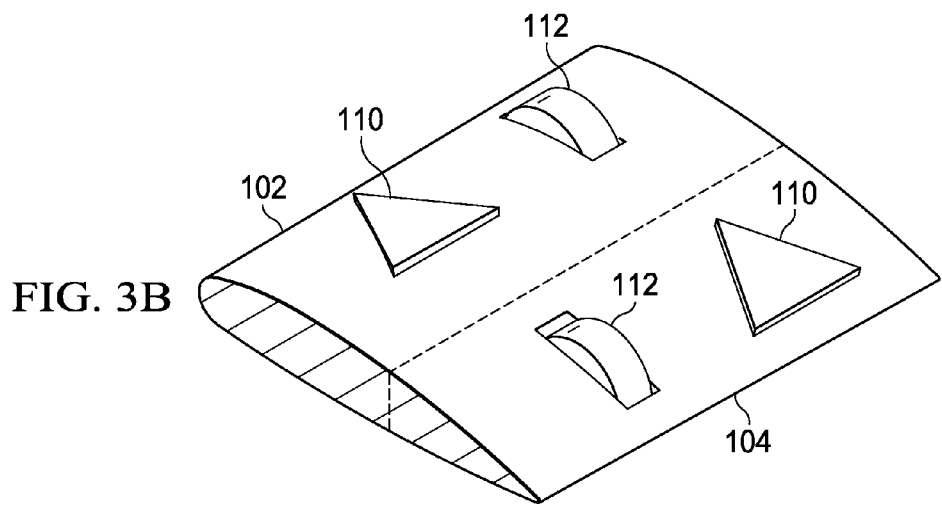
FIG. 3B is an oblique cut-away view of a portion of the rotor blade of FIG. 2 in a partially deployed configuration.
Figure 3C:
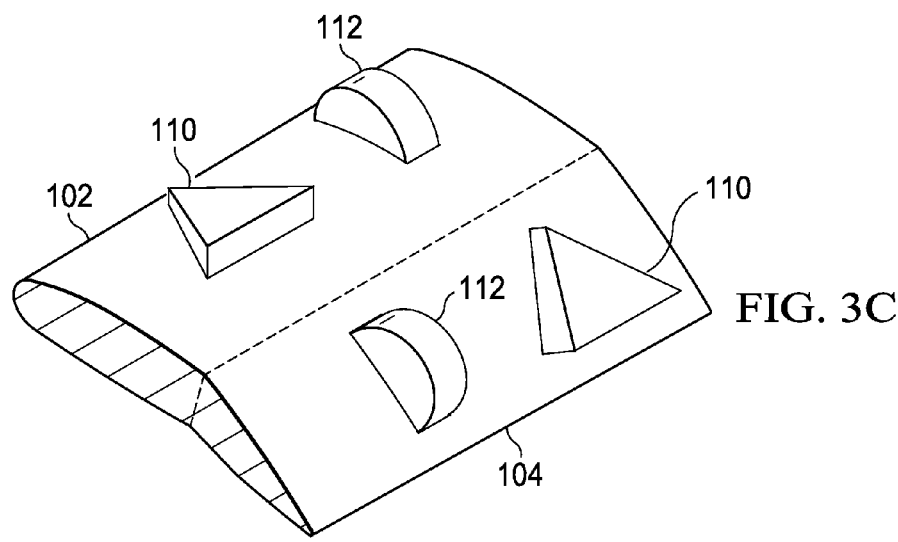
FIG. 3C is an oblique cut-away view of a portion of the rotor blade of FIG. 2 in a fully deployed configuration.

Referring now to FIGS. 3A-3C, oblique cut-away views show a rotor blade 102 in a first configuration, a second configuration, and a third configuration, respectively. Referring to FIG. 3A, the rotor blade 102 is shown in a first configuration where each of the wedge disturbers 110 and gate disturbers 112 are in a stowed position in a manner that does not significantly interact with either the airflow across an exterior of the rotor blade 102 or the airflow across an exterior of the active flap 104. In the first configuration, the active flap 104 itself is in an inactive configuration in which the active flap 104 does not significantly interact with airflow across the rotor blade 102 differently than if the active flap 104 were replaced by a section of rotor blade 102 continuous with the adjacent portions of the rotor blade 102.

Referring to FIG. 3B, the rotor blade 102 is shown in a second configuration where each of the wedge disturbers 110 and gate disturbers 112 are in an at least partially deployed position in a manner that interacts with the airflow across an exterior of the rotor blade 102 and/or the airflow across an exterior of the active flap 104. In the second configuration, the active flap 104 itself is in an inactive configuration in which the active flap 104 does not significantly interact with airflow across the rotor blade 102 differently than if the active flap 104 were replaced by a section of rotor blade 102 continuous with the adjacent portions of the rotor blade 102.

Referring to FIG. 3C, the rotor blade 102 is shown in a third configuration where each of the wedge disturbers 110 and gate disturbers 112 are in an at least partially deployed position in a manner that interacts with the airflow across an exterior of the rotor blade 102 and/or the airflow across an exterior of the active flap 104. In the third configuration, the active flap 104 itself is in a deployed configuration in which the active flap 104 interacts with airflow across the rotor blade 102 differently than if the active flap 104 were replaced by a section of rotor blade 102 continuous with the adjacent portions of the rotor blade 102.

Figure 4A:
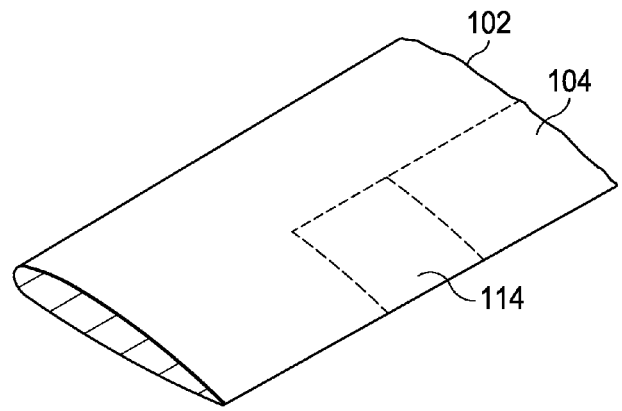
FIG. 4A is an oblique cut-away view of a rotor blade comprising a flap shield in a stowed/inactive configuration.
Figure 4B:
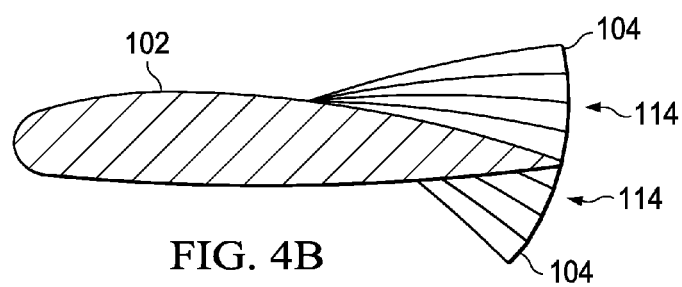
FIG. 4B is a schematic side view of the rotor blade of FIG. 4A with the flap shield shown in two fully deployed configurations.
Figure 4C:
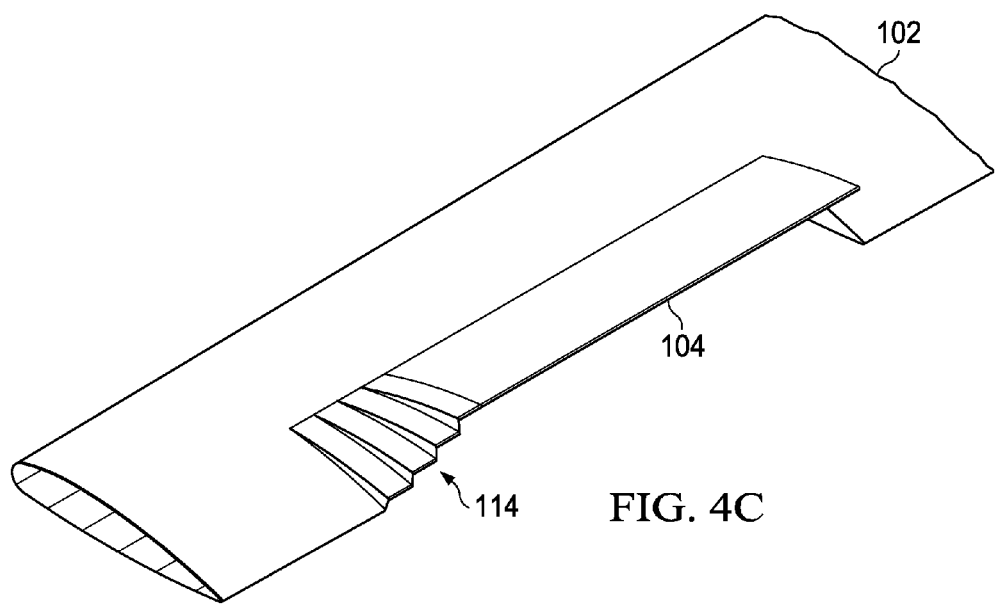
FIG. 4C is an oblique cut-away view of the rotor blade of FIG. 4A with the flap shield in a deployed configuration.

Referring now to FIGS. 4A-4C, an oblique cut-away view, a schematic cut-away side view, and an another oblique cut-away view show a rotor blade 102 in a first configuration (FIG. 4A) and a second configuration (FIGS. 4B and 4C). Referring to FIG. 4A, the rotor blade 102 is shown in a first configuration where each of the active flap 104 and flap shield 114 are in a stowed and/or inactive position in which the active flap 104 and the flap shield 114 do not significantly interact with airflow across the rotor blade 102 differently than if the active flap 104 and the flap shield 114 were replaced by a section of rotor blade 102 continuous with the adjacent portions of the rotor blade 102.

Referring to FIG. 4B, a schematic cut-away side view of the rotor blade 102 is shown in a second configuration where each of the active flap 104 and flap shield 114 are in a fully deployed and/or active position in which the active flap 104 and the flap shield 114 interact with airflow across the rotor blade 102 differently than if the active flap 104 and the flap shield 114 were replaced by a section of rotor blade 102 continuous with the adjacent portions of the rotor blade 102. While not simultaneously physically possible, for illustration purposes, the active flap 104 and the flap shield 114 are shown in each of a flap up full deployment configuration and a flap down full deployment.

Referring to FIG. 4C, an oblique cut-away view of the rotor blade 102 is shown in the second configuration where each of the active flap 104 and flap shield 114 are in a fully deployed and/or active position in which the active flap 104 and the flap shield 114 interact with airflow across the rotor blade 102 differently than if the active flap 104 and the flap shield 114 were replaced by a section of rotor blade 102 continuous with the adjacent portions of the rotor blade 102.

Figure 4D:
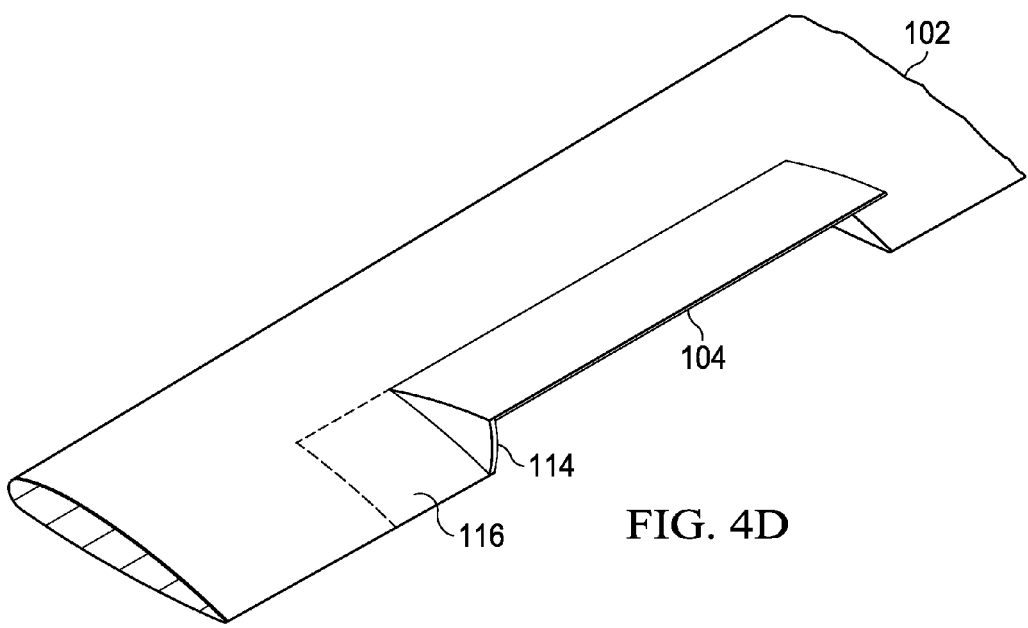
FIG. 4D is an oblique cut-away view of the rotor blade of FIG. 4A with a flap shield comprising a sheet of material.

Referring to FIG. 4D, an oblique cut-away view of the rotor blade 102 is shown in the second configuration where each of the active flap 104 and flap shield 114 are in a fully deployed and/or active position in which the active flap 104 and the flap shield 114 interact with airflow across the rotor blade 102 differently than if the active flap 104 and the flap shield 114 were replaced by a section of rotor blade 102 continuous with the adjacent portions of the rotor blade 102. In this embodiment, the flap shield 114 may comprise a continuous sheet of material that may be selectively rolled and/or slid in sheet form into and/or out of a receptacle 116 within an interior of the rotor blade 102 or other attached structure.

Figure 5:
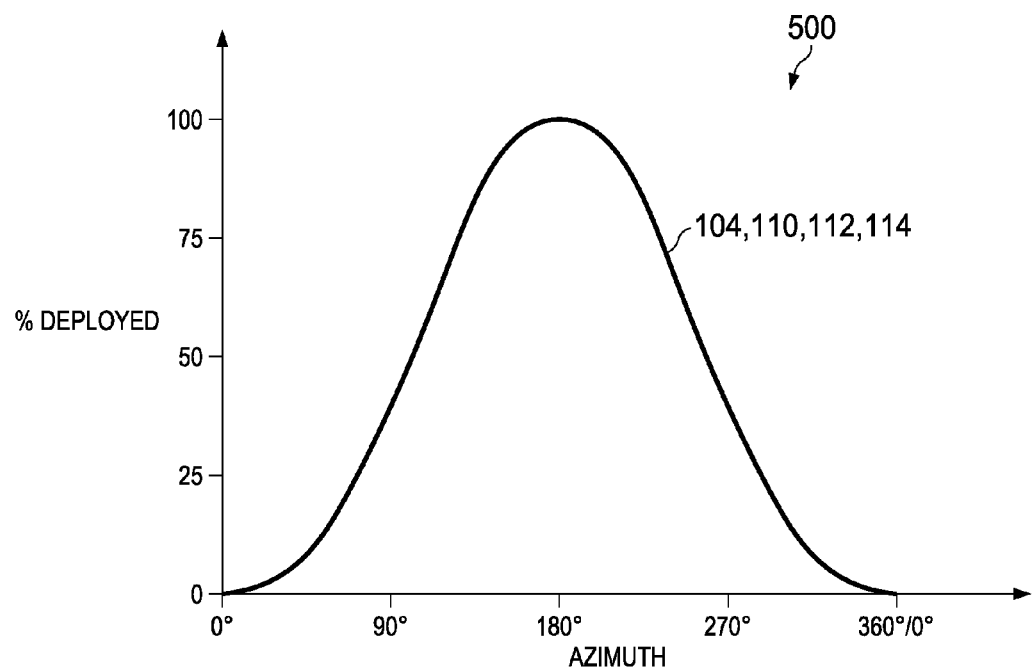
FIG. 5 is a chart showing operation of the rotor system of FIG. 1 according to an embodiment of the disclosure.

Referring now to FIG. 5, a chart 500 of an example of operation of the rotor system 100 is shown. In operation, the rotor system 100 may be controlled to selectively deploy each of the active flaps 104, wedge disturbers 110, gate disturbers 112, and/or flap shields 114 to substantially similar degrees of their respective impact on airflow across a rotor blade 102. In the chart 500, deployment of the above-described components is expressed as an azimuth position versus a percent deployed. As shown, the rotor system may actuate the above-described components in unison to cause a same percentage of deployment amongst the components as the rotor blade 102 is cyclically rotated and passes through the various azimuth values. In the chart 500, the rotor system is shown as controlling each of the components to be inactive and/or stowed with 0% deployment at an azimuth of 0°, increasing to 100% at 180°, and decreasing to 0% deployment at an azimuth of 360° (0°).

Figure 6:
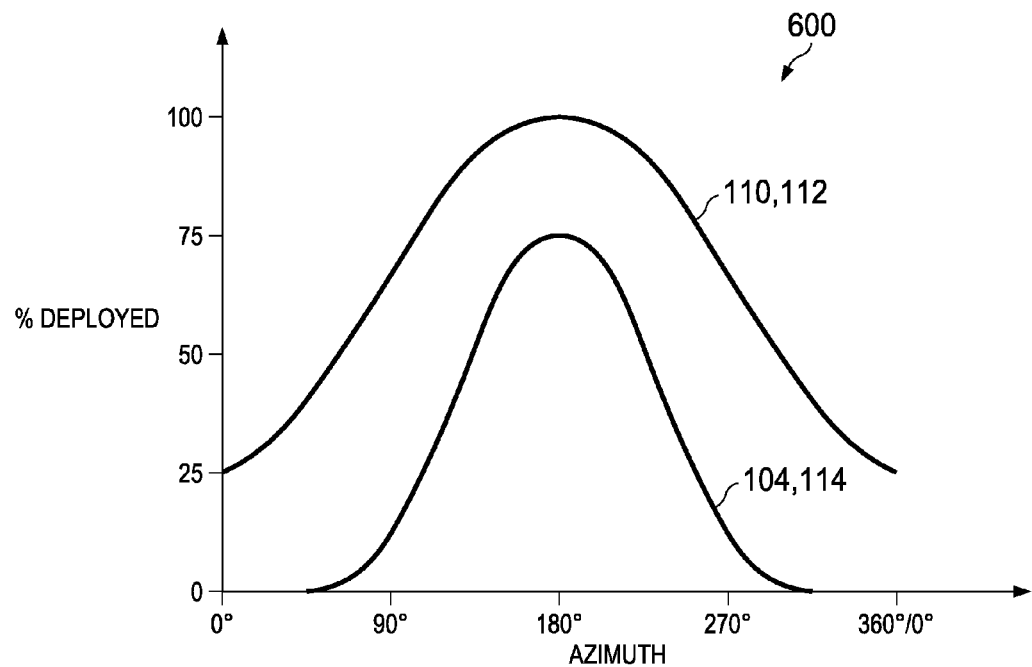
FIG. 6 is a chart showing an alternative operation of the rotor system of FIG. 1 according to an embodiment of the disclosure.

Referring now to FIG. 6, a chart 600 of an example of operation of the rotor system 100 is shown. In operation, the rotor system 100 may be controlled to selectively deploy each of the active flaps 104, wedge disturbers 110, gate disturbers 112, and/or flap shields 114 to different degrees of their respective impact on airflow across a rotor blade 102. In the chart 600, deployment of the above-described components is expressed as an azimuth position versus a percent deployed. As shown, the rotor system 100 may actuate the wedge disturbers 110 and gate disturbers 112 in unison to cause a same percentage of deployment amongst them as the rotor blade 102 is cyclically rotated and passes through the various azimuth values. Specifically the wedge disturbers 110 and gate disturbers 112 are shown as being controlled to 25% deployment at an azimuth of 0°, increasing to 100% at 180°, and decreasing to 25% deployment at an azimuth of 360° (0°). Meanwhile, the active flaps 104 and flap shields 114 are shown as being controlled to increase from 0% deployment while the wedge disturbers 110 and gate disturbers 112 are deployed less than 25% and to increase up to 75% deployment when the wedge disturbers 110 and gate disturbers 112 are deployed at 100%. In this embodiment, it is shown that the various components that may affect airflow across the rotor blade 102 may be controlled independently of each other.

In some cases, each controllable airflow affecting component may be independently controlled to generate a desired airflow across a rotor blade 102. In some cases, with sufficient deployment of wedge disturbers 110 and/or gate disturbers 112, a sufficient amount of noise reduction and/or rotor system 100 efficiency increase may be achieved without requiring the deployment and/or allowing delayed deployment of the active flaps 104 and/or flap shields 114. Further, because one or more of the rotor blades 102 may be controlled to comprise different types, combinations, locations, and/or percentages of deployment of air disturbers 110, 112, active flaps 104, and/or flap shields 114, the rotor system 100 may be referred to as comprising an asymmetrical airflow disturber system and/or configuration. In other words, because the airflow disturbers 110, 112 of a first blade may at the same time be differently deployed from the airflow disturbers 110, 112 of a second blade, the system may be referred to as providing an asymmetrical deployment of airflow disturbers 110, 112. While particular shape and features of airflow disturbers 110, 112 are shown and described, this disclosure contemplates that any other controllable feature that may be associated with a rotor blade and selectively operated to disturb and/or manage airflow across the rotor blade may be similarly utilized to reduce noise and/or increase an efficiency of the rotor system 100. In some embodiment, flap shields 114 may be configured to selectively extend above and/or below an upper rotor surface and/or a lower rotor surface. In some embodiments, the airflow disturbers 110, 112 and/or flap shields 114 may be provided on propeller systems and/or wings of fixed wing aircraft. The active flaps 104 may comprise a slotted, fowler, plain, split, and/or any other suitable type of flap. In alternative embodiments, the active flaps 104 may comprise slats and, unless otherwise stated, the term "flap" includes slats.

Figure 7A:
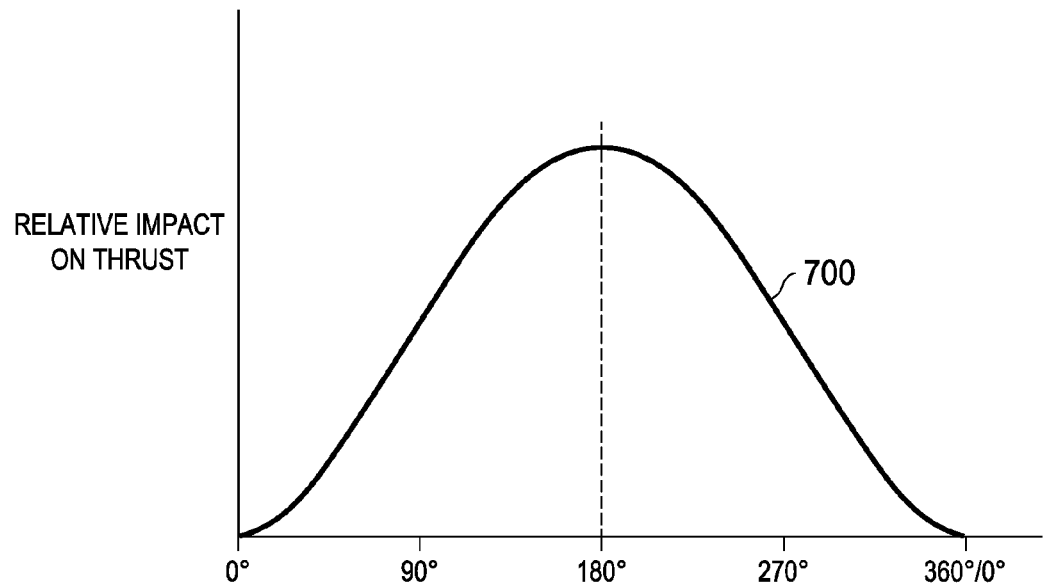
FIG. 7A is a chart showing an impact of a pitch change on thrust.

Referring now to FIG. 7A, a chart comprising an impact curve 700 representative of a relative impact a rotor blade 102 positive pitch change has on thrust versus an azimuth. In this embodiment, the positive pitch change reaches a maximum at an azimuth of 180°. Accordingly, the positive pitch change produces a maximum impact on thrust at 180°. The positive pitch change represented by impact curve 700 is a cyclical change in pitch because it varies in a repetitive nature as the rotor blade 102 rotates.

Figure 7B:
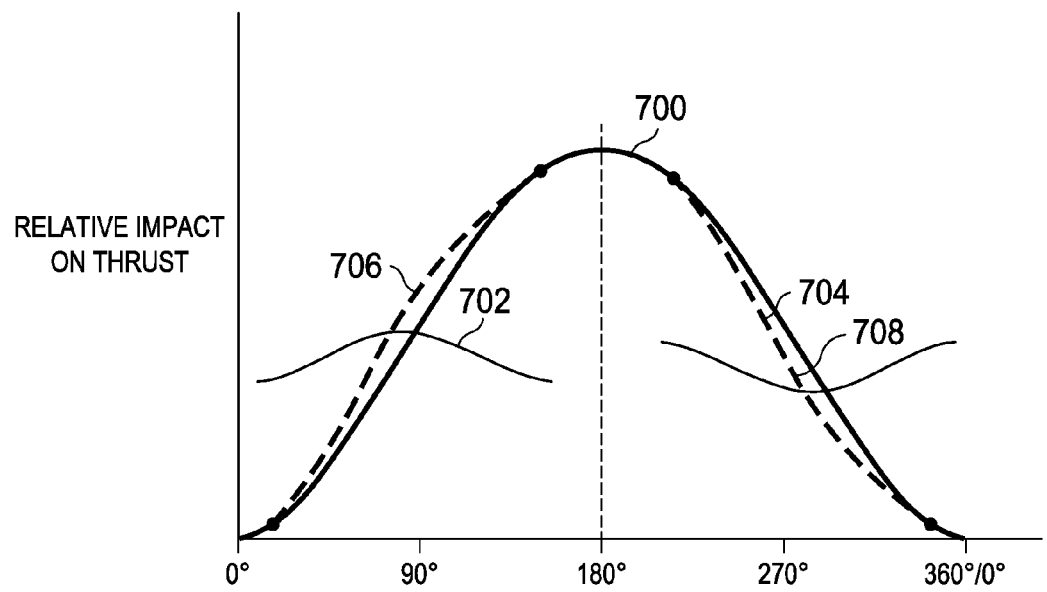
FIG. 7B is a chart showing the impact of the pitch change on thrust of FIG. 7A as augmented by two active flap deployments.

Referring now to FIG. 7B, a chart substantially similar to the chart of FIG. 7A additionally comprises a positive active flap deployment curve 702 and a negative active flap deployment curve 704. The positive active flap deployment peaks at about 90° and the impact of the positive active flap deployment is to generally additively increase an overall positive impact on thrust as shown by the curve segment 706 relative to the impact curve 700 alone. The negative active flap deployment peaks at about 270° and the impact of the negative active flap deployment is to generally additively decrease an overall positive impact on thrust as shown by the curve segment 708 relative to the impact curve 700 alone. Each of the positive and negative active flap deployments are cyclical because they vary in a repetitive nature as the rotor blade 102 rotates.

Figure 7C:
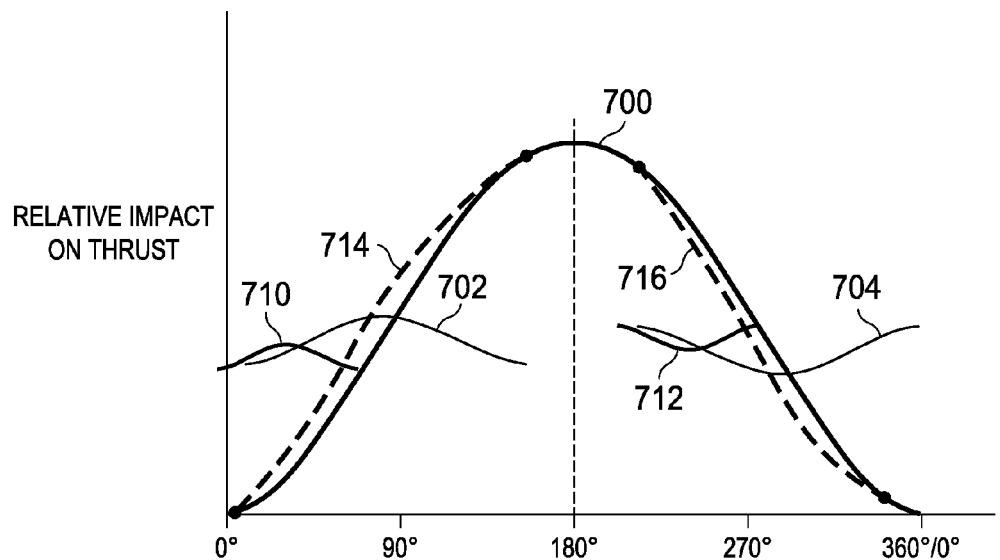
FIG. 7C is a chart showing an impact of the pitch change on thrust as augmented by the active flap deployments of FIG. 7B as augmented by two air disturber deployments.

Referring now to FIG. 7C, a chart substantially similar to the chart of FIG. 7B additionally comprises a positive air disturber curve deployment associated with the positive air disturber deployment curve 710 and a negative air disturber deployment associated with a negative air disturber deployment curve 712. The positive air disturber deployment peaks at about 45° and works to increase an effectiveness of the positive active flap deployment. The increase in effectiveness of the positive active flap deployment attributable to the positive air disturber deployment can be seen by comparing the curve segment 714 to the curve segment 706. The negative air disturber deployment peaks at about 225° and works to increase an effectiveness of the negative active flap deployment. The increase in effectiveness of the negative active flap deployment attributable to the negative air disturber deployment can be seen by comparing the curve segment 716 to the curve segment 708. Each of the positive and negative air disturber deployments are cyclical because they vary in a repetitive nature as the rotor blade 102 rotates.

Figure 7D:
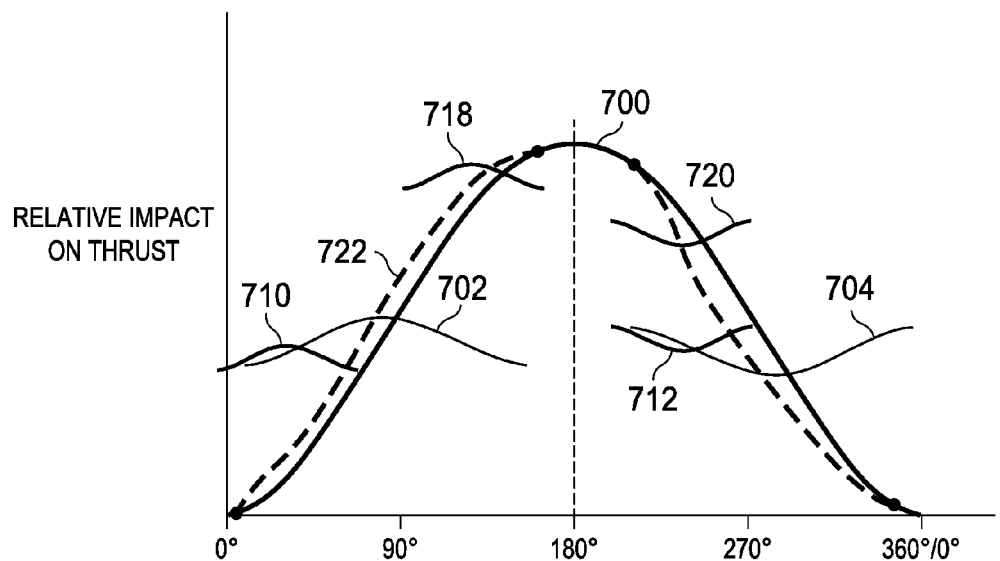
FIG. 7D is a chart showing the impact on thrust of FIG. 7C as augmented by two additional independent air disturber deployments.

Referring now to FIG. 7D, a chart substantially similar to the chart of FIG. 7C additionally comprises an independent positive air disturber curve deployment associated with the independent positive air disturber deployment curve 718 and an independent negative air disturber deployment associated with an independent negative air disturber deployment curve 720. The independent positive air disturber deployment peaks at about 135° and works to increase an effectiveness of the positive pitch change. The increase in effectiveness of the positive pitch change attributable to the independent positive air disturber deployment can be seen by comparing the curve segment 722 to the curve segment 714. The independent negative air disturber deployment peaks at about 270° and works to decrease an effectiveness of the positive pitch change. The decrease in effectiveness of the positive pitch change attributable to the independent negative air disturber deployment can be seen by comparing the curve segment 724 to the curve segment 716. Each of the independent positive and independent negative air disturber deployments are cyclical because they vary in a repetitive nature as the rotor blade 102 rotates.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A rotor blade, comprising:
an active flap; and
an airflow disturber disposed at least partially on the active flap and selectively extending from a surface profile of the active flap, the airflow disturber comprising a wedge disturber having a triangular profile, wherein a point of the triangular profile points toward a leading edge of the rotor blade, the airflow disturber configured to selectively alter airflow across the active flap; and
wherein the airflow disturber is selectively extendible between a first stowed position that does not extend beyond the surface profile of the active flap, a second deployed position of the airflow disturber that extends beyond the surface profile of the active flap, and a third partially deployed position of the active flap between the first stowed position and the second deployed position.

2. The rotor blade of claim 1, wherein airflow disturber is deployable without deploying the active flap.

3. The rotor blade of claim 1, comprising a plurality of wedge disturbers each having a triangular profile, wherein a point of each triangular profile points toward a leading edge of the rotor blade; and
wherein the plurality of wedge disturbers comprises the first-mentioned wedge disturber disposed on the rotor blade, a second wedge disturber disposed on the rotor blade, and a third wedge disturber disposed on the active flap of the rotor blade.

4. The rotor blade of claim 3, wherein the third wedge disturber is disposed longitudinally between the first wedge disturber and the second wedge disturber with respect to a longitudinal axis of the rotor blade.

5. A rotor system, comprising:
a first rotor blade comprising an active flap configured to move relative to an adjacent surface profile of the first rotor blade, wherein a gap exists between the active flap and the adjacent surface profile of the first rotor blade;
a flap shield comprising a first end attached to the first rotor blade and a second end opposite the first end attached to the active flap, wherein, in response to the active flap moving relative to the surface profile of the first rotor blade, the flap shield is configured to deform between the first rotor blade and the active flap to close the gap between the active flap and the adjacent surface profile of the first rotor blade; and
a plurality of airflow disturbers disposed on the first rotor blade and configured to selectively disturb airflow across the active flap of the first rotor blade, the plurality of airflow disturbers comprising a first wedge disturber having a triangular profile, wherein a point of the triangular profile points toward a leading edge of the first rotor blade.

6. The rotor system of claim 5, further comprising a second rotor blade comprising a second active flap, wherein the plurality of airflow disturbers is configured to selectively disturb airflow such that airflow across the first rotor blade is different than airflow across the second rotor blade.

7. The rotor system of claim 5, wherein the plurality of airflow disturbers comprises a gate disturber.

8. The rotor system of claim 5, wherein the plurality of airflow disturbers is disposed at least partially on the first rotor blade and not on the associated active flap of the first rotor blade.

9. The rotor system of claim 5, wherein the plurality of airflow disturbers is disposed at least partially on the associated active flap of the first rotor blade and not on a remainder of the first rotor blade.

10. The rotor system of claim 5, wherein the plurality of airflow disturbers is disposed at least partially on the first rotor blade and on the associated active flap of the first rotor blade.

11. The rotor system of claim 5, wherein the flap shield comprises a plurality of pivotable stacked elements configured to pivot in unison with the active flap.

12. The rotor system of claim 5, wherein the flap shield comprises a folded sheet of material.

13. The rotor system of claim 5, wherein the flap shield comprises a selectively rolled sheet of material, and the rotor blade comprises a receptacle in an interior of the rotor blade, the selectively rolled sheet of material of the flap shield configured to roll into or out of the receptacle to close the gap between the active flap and the rotor blade.

14. The rotor system of claim 5, wherein the plurality of airflow disturbers comprises the first wedge disturber disposed on the first rotor blade and not on the associated active flap of the first rotor blade, a second wedge disturber disposed on the first rotor blade and not on the associated active flap of the first rotor blade, and a third wedge disturber disposed on the active flap of the first rotor blade, wherein the second wedge disturber and the third wedge disturber each comprise a triangular profile, wherein a point of each of the triangular profiles points toward the leading edge of the rotor blade.

15. The rotor system of claim 14, wherein the third wedge disturber is disposed longitudinally between the first wedge disturber and the second wedge disturber with respect to a longitudinal axis of the first rotor blade.

16. A method comprising:
attaching a flap shield in a gap between an active flap of a rotor blade and an adjacent surface profile of the rotor blade, wherein the flap shield comprises a first end attached to the rotor blade and a second end opposite the first end attached to the active flap;
moving the active flap of the rotor blade relative to the adjacent surface profile of the rotor blade between an inactive position of the active flap within the adjacent surface profile of the rotor blade and a deployed position of the active flap offset from the adjacent surface profile of the rotor blade;
deforming, in response to moving the active flap of the rotor blade, the flap shield between the rotor blade and the active flap to close the gap between the active flap and the adjacent surface profile of the rotor blade, and
selectively extending an airflow disturber disposed on the rotor blade beyond the surface profile of the rotor blade to interact with airflow over the rotor blade, the airflow disturber comprising a wedge disturber having a triangular profile, wherein a point of the triangular profile points toward a leading edge of the rotor blade.

17. The method of claim 16, further comprising selectively extending second airflow disturber disposed on the active flap of the rotor blade beyond a surface profile of the active flap to interact with airflow over the active flap, the second airflow disturber comprising a second wedge disturber having a triangular profile, wherein a point of the triangular profile points toward the leading edge of the rotor blade.

* * * * *